(12) United States Patent
Guering et al.

(10) Patent No.: US 9,745,067 B2
(45) Date of Patent: Aug. 29, 2017

(54) METHOD OF INTEGRATING AN AVIONICS BAY AND FLOOR STRUCTURE FOR IMPLEMENTATION

(71) Applicant: AIRBUS OPERATIONS (S.A.S.), Toulouse (FR)

(72) Inventors: Bernard Guering, Montrabe (FR); Yves Durand, Aussonne (FR)

(73) Assignee: Airbus Operations (S.A.S.), Toulouse (FR)

( * ) Notice: Subject to any disclaimer, the term of this patent is extended or adjusted under 35 U.S.C. 154(b) by 868 days.

(21) Appl. No.: 13/630,877

(22) Filed: Sep. 28, 2012

(65) Prior Publication Data
US 2013/0084792 A1    Apr. 4, 2013

(30) Foreign Application Priority Data

Sep. 30, 2011  (FR) ..................................... 11 58843

(51) Int. Cl.
*B64D 13/00*    (2006.01)
*B64C 1/18*    (2006.01)
*B64D 13/06*    (2006.01)

(52) U.S. Cl.
CPC ............... *B64D 13/00* (2013.01); *B64C 1/18* (2013.01); *B64D 2013/0614* (2013.01); *Y02T 50/44* (2013.01)

(58) Field of Classification Search
CPC .... B64D 13/04; B64D 13/00; B64D 11/0015; B64C 1/18
(Continued)

(56) References Cited

U.S. PATENT DOCUMENTS

| 4,153,225 A | * | 5/1979 | Paulsen | .............. | H05K 7/20572 244/118.1 |
| 5,927,030 A | * | 7/1999 | Petit | .................. | E04F 15/02458 52/220.1 |

(Continued)

FOREIGN PATENT DOCUMENTS

| FR | 2833241 | 6/2003 |
| WO | WO 2009/106430 | 9/2009 |

OTHER PUBLICATIONS

French Search Report and Written Opinion for FR 1158843 dated Jun. 5, 2012.

(Continued)

*Primary Examiner* — Steven B McAllister
*Assistant Examiner* — Jonathan Cotov
(74) *Attorney, Agent, or Firm* — Jenkins, Wilson & Taylor & Hunt, P.A.

(57) ABSTRACT

An integrated avionics bay in a floor area can be provided with adequate ventilation. The structure of an aircraft cockpit floor is able to integrate at least one bay, with a walking floor in the cockpit, a structural volume and a bay integrated in a space of the liberated structural volume. The bay as integrated in a horizontal position in this space includes a peripheral frame with at least one protective cover with a direct access to the bay at the floor level and a lower wall with a rear face access. Side openings formed in the frame can couple with vertical walls to allow fresh air blowing from the rear wall of the bay via a flow from rearwards to upwards to reach the top cover and an air extraction by an upper surface extractor.

15 Claims, 3 Drawing Sheets

(58) Field of Classification Search
USPC .......................... 454/71, 74, 76; 244/118.1
See application file for complete search history.

(56) References Cited

U.S. PATENT DOCUMENTS

| | | | | |
|---|---|---|---|---|
| 6,058,288 | A * | 5/2000 | Reed | B64D 11/0015 348/E7.05 |
| 6,290,518 | B1 * | 9/2001 | Byrne | H02G 3/185 16/224 |
| 6,427,945 | B1 * | 8/2002 | Bansemir | B64C 1/062 244/119 |
| 6,527,566 | B1 * | 3/2003 | Lambiaso | H02G 11/00 439/131 |
| 6,585,189 | B1 * | 7/2003 | Smallhorn | B64C 1/18 244/118.5 |
| 6,610,927 | B2 * | 8/2003 | Dinh | H02G 3/185 174/66 |
| 7,205,488 | B2 * | 4/2007 | Riner | H02G 3/185 174/481 |
| 8,360,363 | B2 * | 1/2013 | Gonnsen | B64C 1/18 244/118.1 |
| 8,810,999 | B2 * | 8/2014 | Guering | H02G 3/00 165/104.33 |
| 2003/0036347 | A1 * | 2/2003 | Lambiaso | H05K 7/1412 454/184 |
| 2003/0106962 | A1 * | 6/2003 | Smallhorn | B64C 1/18 244/118.5 |
| 2003/0106963 | A1 * | 6/2003 | Smallhorn | B64D 11/0015 244/125 |
| 2006/0202084 | A1 * | 9/2006 | Smallhorn | B64D 11/0015 244/118.5 |
| 2011/0127379 | A1 * | 6/2011 | Jager | B64C 1/18 244/118.1 |

OTHER PUBLICATIONS

Chinese Office Action for Application No. 201210459996 dated Mar. 16, 2016.

* cited by examiner

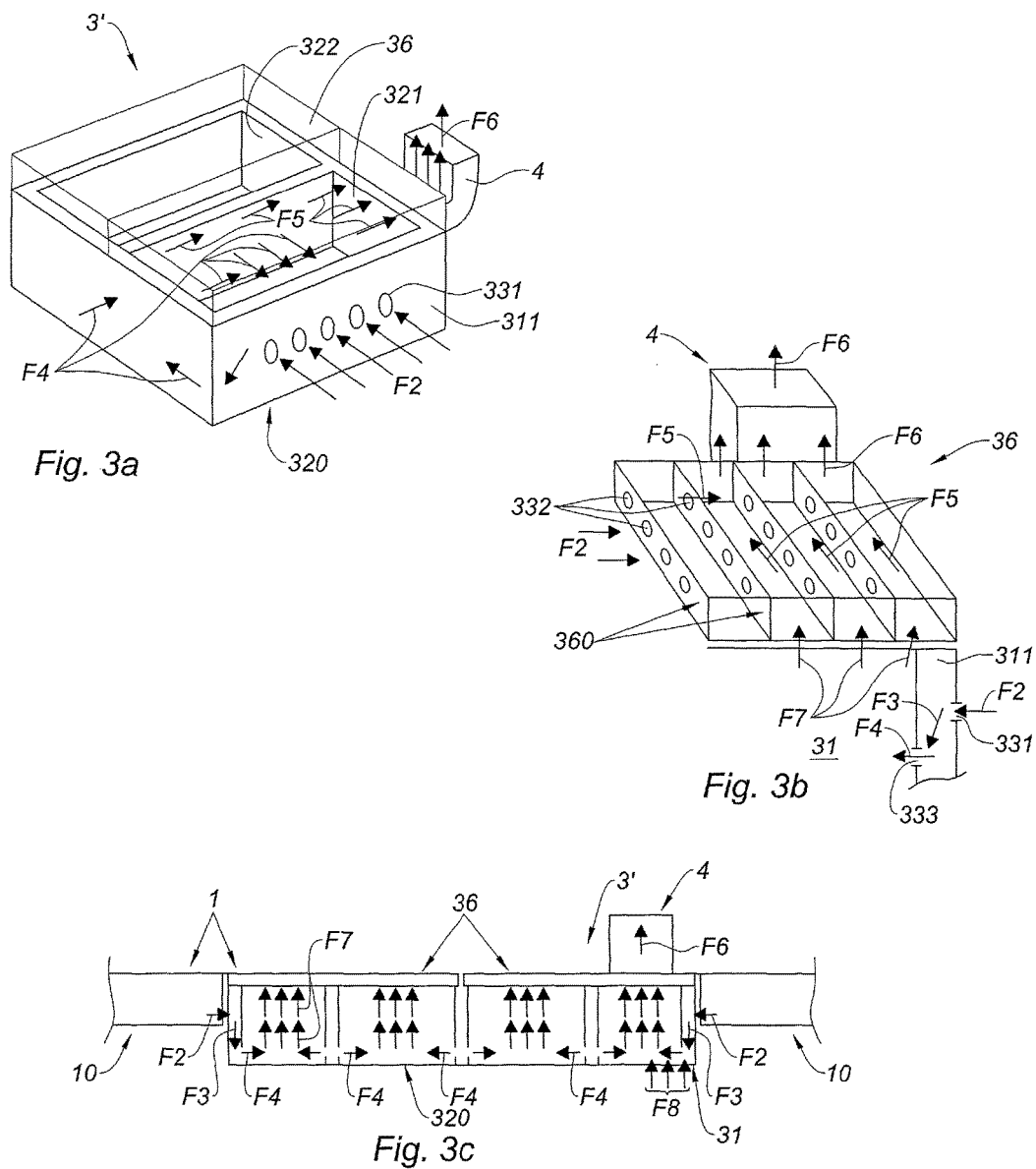

METHOD OF INTEGRATING AN AVIONICS BAY AND FLOOR STRUCTURE FOR IMPLEMENTATION

CROSS-REFERENCE TO RELATED APPLICATION

This application claims the benefit of and priority to French Patent Application No. 11 58843 filed Sep. 30, 2011, the entire disclosure of which is herein incorporated by reference.

TECHNICAL FIELD

The invention relates to a method of integrating an avionics bay in a floor structure of an aircraft, as well as to a floor structure of an aircraft, in particular of a cockpit, in which such a bay is integrated.

As far as its main implementation is concerned, the invention relates to the optimized setting up of an avionics bay grouping together one or several electric and\or electronic units which integrate electric and\or electronic equipments such as computers and their avionics functions. The ventilation of these units in such a cluttered space is an aspect of the scope of the invention which can be taken into consideration.

BACKGROUND

So far, units such as electric and\or electronic bays are classically arranged vertically and integrated in the hold, under the cockpit, but partially extend in the freight area situated under the space for the passenger cabin. The terms "vertical", "horizontal", "upper", "lower", as well as their derivatives, refer to generally used standard positions in reference to the universal gravity.

These units are classically arranged vertically and are composed on the basis of a load bearing frame including at least two posts on which horizontal shelves are mounted. Shelves and posts are arranged into hermetic boxes with simple or double compartment. These boxes fulfil a structural function as well as a function of integrated air circulation.

Shelves are used to support the electronic modules (computers, cards, additional discs, electronic equipments, power modules, etc.) via standardized intermediate racks. These racks fulfil both the mechanical linkage and the electric connection of every module accommodated in the rack.

On the rear face of the unit, an intermediate electricity network fulfils for every module, or every interconnection between several modules, the connection with the outside electricity network (known as "plane electricity network") via cutoff plates.

On the front face, an easy access to computers is provided for a quick integration or replacement after a defective function was detected during a phase of maintenance or pre-flight control.

The vertical position of the units facilitates front face and rear face access.

In a more recent standard of integration taking the form of a "cabinet", a single rack, known as "maxi rack", occupies a whole shelf. The rear electrical integration is then simplified because all the electrical connectors are arranged on the same mother-board, which is integrated into the cabinet. In this cabinet, the electrical functions are distributed by "blade"-type cards (i.e. relatively low thickness cards). Cabinets are grouped together in a box or arranged individually like the shelves.

As electronic modules dissipate heat and are sensitive to high temperatures as well as to variations in temperature, it is advantageous to ventilate them. To this end, each module is classically cooled by blowing fresh air through the module and then extracting the warm air over every module. The unit is interconnected to the general ventilation circuit of the aircraft.

In order to optimize the available space and thus increase the number of modules, it is well known how to integrate the cooling circuit directly into the frame of the unit to fulfil a thermic exchange with the air circulating in the box. So, as shown by the sectional view of a shelf G according to FIG. 1, a duct for blowing air S and a duct for extracting air E provided in a post M of shelf G—located between two compartments C1 and C2 for housing computers—allow a thermic exchange of air.

Besides, units are generally attached to the structure of the aircraft by means of links made of (Chappe-type) pin and connecting rod. An isostatic global connection is thus obtained with respect to the aircraft structure, which allows to take the deformations of the aircraft structure into account.

However, one seeks at present to install the electric and\or electronic bays in secure spaces because these bays, which integrate more and more all the command and control functions, are of a vital importance. An appropriate secure space would be in particular the cockpit of the aircraft.

The integration of such units in a cockpit was not possible until now because of the clutter problems involved by such an installation, substantially not compatible with the ventilation of avionics bays or units including electronic circuits.

SUMMARY

The invention aims to overcome these drawbacks by providing an integration of an avionics bay, advantageously of large housing capacity of electric/electronic functions, in a floor zone, the integration being possibly associated to ventilation means suited to this place.

More precisely, the object of the present invention is a method of integrating an avionics bay in an aircraft floor structure. A space is firstly liberated in the floor structure. The bay is then integrated in a horizontal position in this provided space. A direct access to this bay from the upper surface is made at floor level by means of a protection which also fulfils the function of a floor.

In a preferred way, a forced ventilation of the bay can be performed by blowing fresh air which is delivered vertically from the lower wall of the bay and then extracted through the upper wall after thermic exchange. Besides, a transfer of shear load is performed by reinforcing the structural volume around of the aforementioned space. Furthermore, an access at the lower surface of the bay can also be made from the nose section hold.

According to advantageous features, the method according to the invention also provides: a function consisting in supplying fresh air laterally, between the upper and lower walls, before diverting said air towards the lower wall and then delivering it vertically from the lower wall; a sealing and fluid drainage function outside the bay; and\or a function of air collection dedicated to the cover with a view to an extraction via a channelled air flow.

The invention also relates to a floor structure of an aircraft, in particular of a cockpit, which is able to integrate at least one such bay according to the above method. This structure contains a walking floor and a structural volume supported by crosspieces on which the floor rests. Crosspieces and floor are cut so that a space is liberated in the structural volume to integrate the bay into it in a horizontal position.

In an advantageous way, side openings formed in the frame and associated with vertical walls are able to allow fresh air blowing from the lower wall of the bay up to the top cover and air extraction by means of an upper surface extractor. Besides, sheets for transferring the load are arranged at right angles with and between the cut girders. Furthermore, the bay can comprise a peripheral frame with at least one articulated protective cover for direct access to said bay at the floor level and an access rear opening in the lower surface. Besides, the bay, integrated in a horizontal position in this space, can be interlocked with the floor and\or cut girders using point fastening means.

According to some preferred embodiments:
the bay is divided in boxes comprising vertical walls able to allow the upward blowing of fresh air in every compartment;
the structural volume of the floor is divided in boxes;
the side openings are equipped with a diaphragm;
the walls and cover are arranged in connexion with the perforated stiffening sheets.

The present invention applies in particular to the floor structure of an aircraft cockpit which is a privileged secured space, whereby the structural volume of the floor separates the cockpit from the nose section hold. The floor of other areas of the aircraft can also be used, in particular that of specialized passage areas (kitchen, toilet, etc.).

BRIEF DESCRIPTION OF THE DRAWINGS

Other data, characteristics and advantages of the present invention will appear in reading the following non-limited description referring to the annexed drawings which represent respectively:

FIGS. 3a to 3c, schematic perspective (FIG. 3a), perspective and sectional enlarged partial (FIG. 3b) and sectional (FIG. 3c) views of a ventilated avionics bay according to the invention.

DETAILED DESCRIPTION

The terms "front", "rear", "side" and their derivatives used in the present description define positions of elements with regard to the standard relative location of these elements in a plane standing on the ground.

Figure 1:
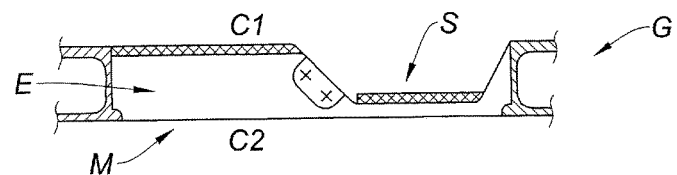
FIG. 1, a sectional view of a shelf of an avionics unit (already described)
Figure 2:
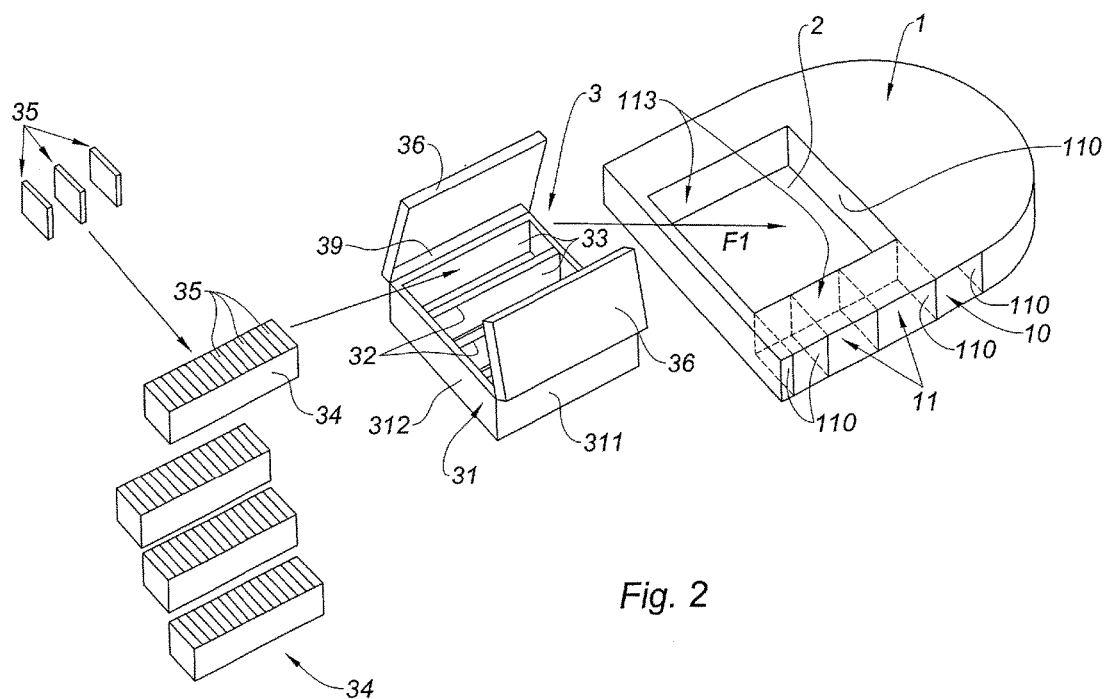
FIG. 2, an exploded schematic view of the assembling of an avionics bay with maxi racks in a floor structure according to the invention.

The example described in reference to the overall view of FIG. 2 relates to a cockpit floor. The cockpit walking floor 1 is pierced open to liberate a space 2 in its structure 10 to accommodate an avionics bay 3 according to the arrow F1. An advantageous place for this space 2 is situated in the access corridor to flight crew compartments (see FIG. 4).

The floor structure 10 is made of boxes 11, the walls of which are crosspieces 110. This floor structure 10 is pierced by cutting crosspieces 110 over an appropriate length (some crosspieces are schematically represented in the form of dashed lines). Stiffening sheets 113 are interlocked at right angles with and between these cuts to favour the load transfer to the uncut floor structure. Space 2 is limited longitudinally by these sheets 113 and transversely by uncut crosspieces 110. The dimensions of space 2 are substantially those of bay 3 to be integrated.

Avionics bay 3 as for it is a unit constituted by a load bearing frame 31 and by longitudinal internal partitions 32 forming shelves 33 able to receive in their whole length, in this example, racks 34 known as "maxi racks". These maxi racks accommodate slim modules having the size of cards 35. Frame 31 consists of two longitudinal walls 311 and two transverse walls 312 according to their position after integration.

Furthermore, bay 3 is closed by means of two relatively thick covers 36 (for instance of the order of 50 to 60 mm in thickness) with regard to the thickness of the frame and the partitions, to preserve a resistance equivalent to the one of the rest of floor 1. This multifunctional aspect of the covers serving as floor saves weight and money. Walls 311, 312 and cover 36 of bay 3 are arranged in connexion with stiffening sheets 113.

These covers fulfil not only the functions of walking floor and mechanical protection of the bay, but also of protection against the penetration of various fluids. To this end, each cover is hermetic and equipped with mechanical links 39 with frame 31 especially chosen for their sealing.

The ventilation of an avionics unit, once integrated into floor structure 10, will now be described in reference to the drawings of FIGS. 3a to 3c.

The perspective view of FIG. 3a, concerning an example of simplified avionics bay 3' with two compartments 321 and 322, shows that longitudinal walls 311 present calibrated openings 331 for blowing in fresh air according to the flow symbolized by parallel arrows F2. This figure describes the ventilation of compartment 321 only, ventilation of compartment 322 being completely similar.

The fresh air circulates then in longitudinal wall 311 down to the bottom 320 of compartment 321 (arrow F3) before circulating (arrows F4) in said compartment from the bottom. Next, the air goes up to the top of unit 3' (arrows F5) and out of said unit via the extractor 4 (arrow F6) interlocked next to cover 36 (drawn as if it were transparent).

On enlarged partial perspective and sectional view of FIG. 3b, cover 36 appears to be also divided by longitudinal stiffeners 360 allowing to channel the air coming from openings 332 formed in the walls of cover 36 and sized within the structural limits. Arrows F5 indicate the air flow in cover 36. The air coming from openings 331 goes into wall 311 of frame 31 then is diverted towards the bottom of the frame (arrow F3) because of the lower position of the internal opening 333 in wall 311.

The sectional view of FIG. 3c uses the same arrow signs to indicate the circulation of the air in bay 3': arrows F2 illustrate the air flow coming from structure 10, arrows F3 the diversion towards the bottom of the frame, arrows F4 the circulation in one or the other direction at lower wall 320 level, arrows F7 the ascent of the air, and arrow F6 its extraction into extractor 4. The air may also come (arrows F8) from the hold via appropriate pipes (not represented). The other references relate to already described elements: cover 36, walking floor 1, frame 31.

Figure 4A:
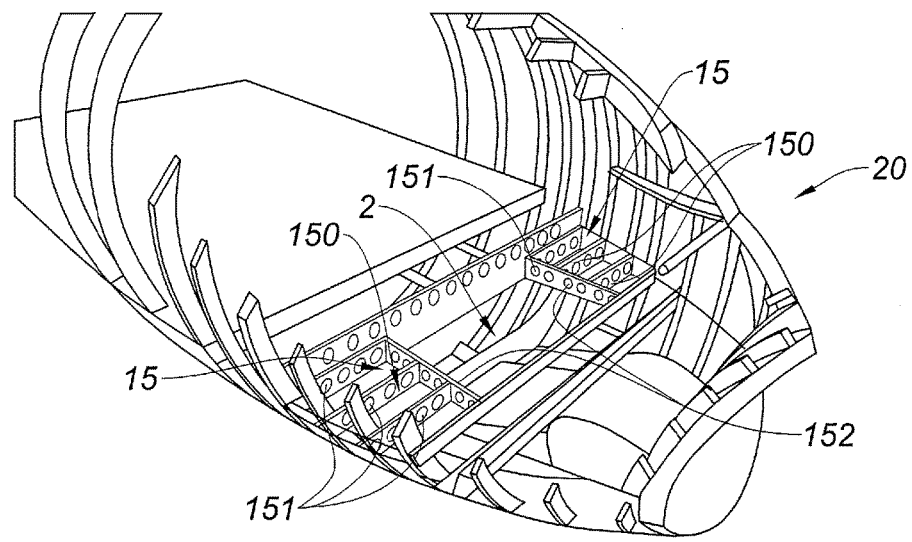
FIGS. 4a and 4b, perspective partial views, from the front and the back of the cockpit, partially equipped, respectively before and after the integration of an avionics bay in the floor according to the invention.

An example of floor structure 10, referring to FIG. 4a of a partial perspective view from the front of a cockpit 20 being equipped, will now be described. Liberated and strengthened space 2 transversally extends over an important part of the width of cockpit 20. This space is bounded with side portions 15 of the floor structure which lead the ventilation. The air comes from pipes (not represented) and is channelled through openings 151 pierced in internal partitions 150 and in longitudinal walls 152. Alternatively, pipes can directly reach the bay without going through the portions of floor.

Figure 4B:
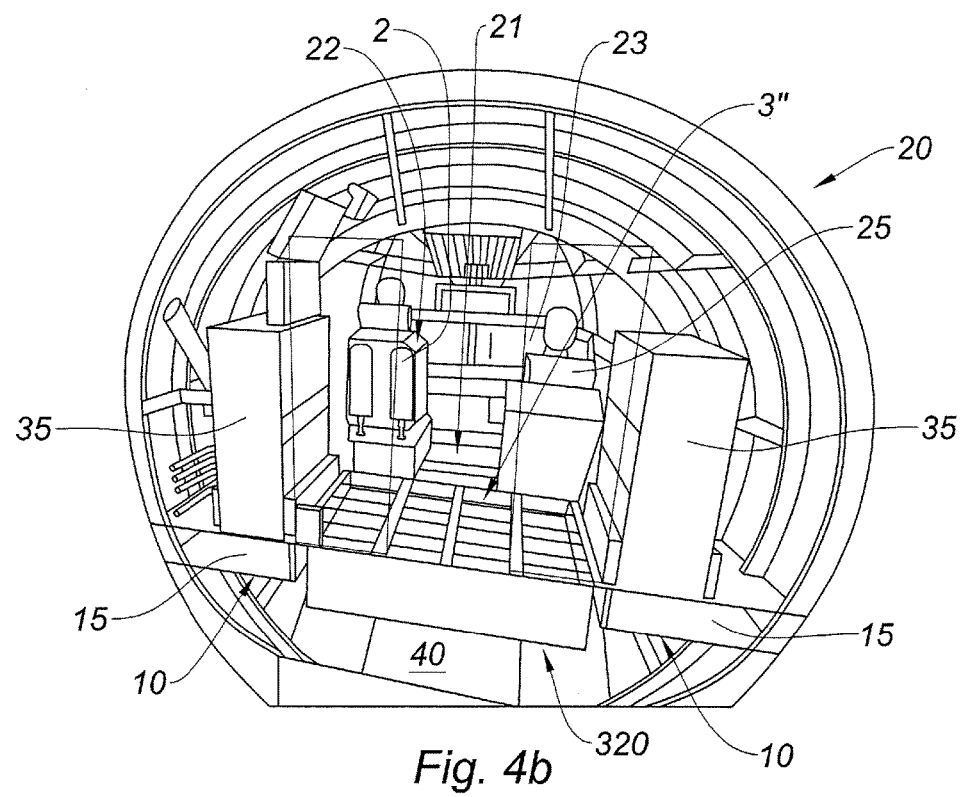

Referring to FIG. 4b, an avionics bay 3" is easily integrated into liberated space 2 of floor structure 10 of cockpit 20 during the fitting-out of the cockpit. More precisely, avionics bay 3" is integrated over a width covering the whole corridor 21 of access to flight crew compartments 22 and 23 of cockpit 20. The attachment of the bay is performed in a very simple way in some discreet points, at angles and on the sides, for example by means of corners or the like maintained by nut and bolt systems.

An excellent access to the avionics bay in a secure zone is thus obtained for bay 3", in particular accessibility to the cables coming from the front hold 40 through the lower wall 320 of the bay. The lower wall is clear because the bottom of the shelves is opened. This access is made from the front hold 40. Furthermore, the proposed architecture offers a good mechanical behaviour because of the relatively low depth of the bay and the support by the peripheral reinforcement, in particular in case of crash loads.

Other units 35 are arranged laterally on the ventilation side portions 15 formed in structure 10. According to the configurations, other parts of floor structure, for example those situated just behind the pilot seats 25 or between the said seats, can be liberated to accommodate avionics bays of appropriate corresponding shape.

Of course, the invention is not limited to the described and shown examples of implementation. So, the bay covers can serve as thermic and phonic protection of the cockpit from a technical zone situated in the hold. Furthermore, when they are properly equipped with gaskets meeting the definition of a superior sealing, these covers can serve as protection against fire and smoke.

Besides, the avionics bay can have only one or multiple covers instead of the described two covers.

The invention claimed is:

1. A method of integrating an avionics bay in an aircraft floor structure, the method comprising:
    liberating a space in the aircraft floor structure;
    integrating the avionics bay in a horizontal position in the space;
    making a direct access to the avionics bay from an upper surface at a floor level by a protective cover configured to function as a floor; and
    performing a forced ventilation of the avionics bay by blowing fresh air vertically from a lower wall of the avionics bay, wherein the protective cover channels the air from the forced ventilation through walls of the avionics bay;
    wherein the avionics bay comprises side openings formed in a frame and associated with vertical walls, the side openings configured for channeling the air through the vertical walls in order to carry out the forced ventilation vertically.

2. The method of integration according to claim 1, wherein performing the forced ventilation of the avionics bay comprises extracting the air through an upper wall of the avionics bay after thermic exchange.

3. The method of integration according to claim 1, further comprising transferring a shear load by reinforcing a structural volume around the space.

4. The method of integration according to claim 1, further comprising making an access through a lower surface of the avionics bay from a front hold.

5. The method of integration according to claim 1, further comprising laterally supplying fresh air, between upper and lower walls of the avionics bay, before diverting the fresh air towards the lower wall and then vertically delivering the fresh air from the lower wall.

6. The method of integration according to claim 1, further comprising performing a sealing and fluid drainage function outside the avionics bay.

7. The method of integration according to claim 1, further comprising collecting fresh air by an upper wall of the avionics bay with the aim of an extraction via a flow of channeled air.

8. A floor structure of an aircraft integrating at least one avionics bay, the floor structure comprising:
    a walking floor; and
    a structural volume supported by crosspieces on which the walking floor rests;
    a protective cover providing a direct access to the avionics bay from an upper surface at a floor level, the protective cover being configured to function as a floor and channel air from a forced ventilation through walls of the avionics bay;
    wherein the crosspieces and the walking floor are cut so that a space is liberated in the structural volume, the avionics bay being integrated in a horizontal position in the space; and
    wherein the avionics bay comprises side openings formed in a frame and associated with vertical walls, the side openings configured for channeling the air through the vertical walls in order to carry out the forced ventilation vertically.

9. The floor structure according to claim 8, wherein the side openings are configured to allow fresh air blowing from a lower wall of the avionics bay up to the protective cover and air extraction by an upper surface extractor.

10. The floor structure according to claim 9, wherein the side openings are equipped with a diaphragm.

11. The floor structure according to claim 8, further comprising stiffening sheets for transferring a load that are arranged just in front of and between cut girders.

12. The floor structure according to claim 8, wherein the avionics bay comprises a peripheral frame with at least one protective cover for direct access to the avionics bay at the floor level and an access rear opening in a lower surface.

13. The floor structure according to claim 12, wherein the walls and the protective cover of the avionics bay are arranged in connection with stiffening sheets.

14. The floor structure according to claim 8, wherein the avionics bay is divided in boxes comprising the vertical walls configured to allow upward blowing of fresh air in every compartment.

15. The floor structure according to claim 8, wherein the structural volume of the floor structure is divided in boxes.

* * * * *